United States Patent Office 3,490,879
Patented Jan. 20, 1970

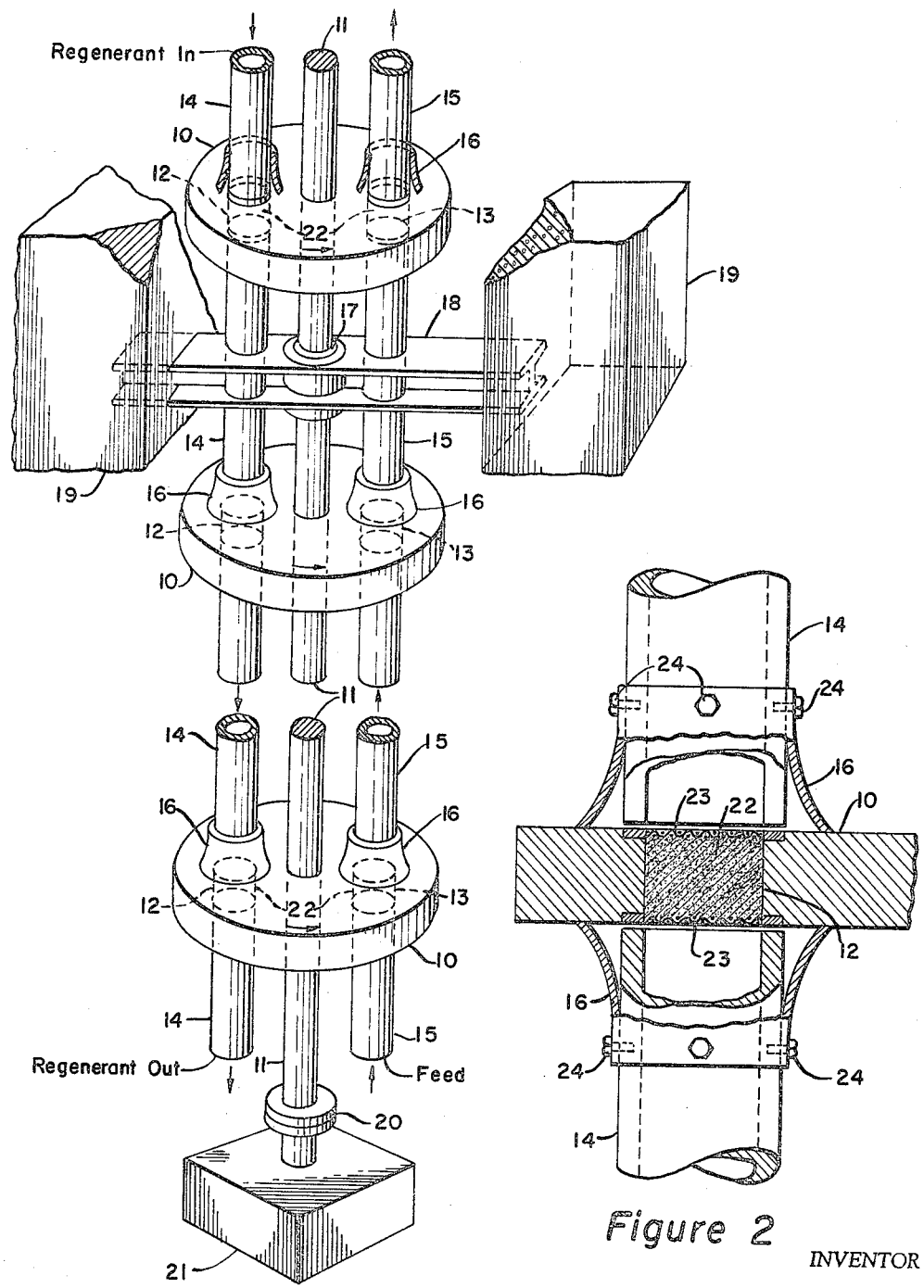

3,490,879
FLUID-SOLID CONTACTING APPARATUS UTILIZING PLURAL ROTOR MEMBERS CONTAINING CONTACT MASSES
Peter Urban, Northbrook, Ill., assignor to Universal Oil Products Company, Des Plaines, Ill., a corporation of Delaware
Original application Mar. 23, 1964, Ser. No. 354,020, now Patent No. 3,306,006, dated Feb. 28, 1967. Divided and this application Aug. 30, 1966, Ser. No. 576,038
Int. Cl. B01j 1/22, 9/04; B01f 3/06
U.S. Cl. 23—288
7 Claims

ABSTRACT OF THE DISCLOSURE

Apparatus for contacting fluids with solids comprising a number of axially spaced rotor members mounted on a common rotating shaft, each such rotor member having two passageways therethrough extending parallel to the axis of rotation and spaced 180° apart (or three passageways spaced 120° apart). A fluid pervious contact mass, such as a selective sorbent or a catalyst, is retained within each passageway. External conduits register with and serially connect the first, second (and third) sets of passageways of all rotor members. The apparatus is useful for carrying out cyclic processes such as the catalytic conversion of hydrocarbons with periodic catalyst regeneration, or the separation of fluid mixtures utilizing a selective sorbent and a fluid desorbent.

---

This application is a division of my copending application Ser. No. 354,020 filed Mar. 23, 1964, now U.S. Patent 3,306,006 issued Feb. 28, 1967.

This invention relates to apparatus for cyclically contacting a solid material with two or more separate fluid streams. More particularly the invention is directed to means for repetitively subjecting a number of beds of solid material to contact first with one stream and then with another in alternating counterflow relationship.

There are various processes wherein a solid contact material is to be successively contacted on a cyclic basis with materials of differing composition, pressure, temperature and/or space velocity. One example is the catalytic conversion of hydrocarbons, particularly catalytic cracking and catalytic reforming, wherein hydrocarbon feed is passed over the catalyst under conversion conditions; in the course of its use the catalyst becomes deactivated by coke, poisons, or loss of a catalytic constituent, and is therefore periodically reactivated or regenerated by contact with a suitable regenerant such as air, oxygen or a chemical reagent. Another example is the separation of the components of a fluid mixture by contacting the feed mixture with a selective sorbent; when a desired amount of selectively sorbed material or sorbate is retained by the sorbent, the latter is then contacted with a suitable desorbent or strippant to remove the sorbate and prepare the sorbent for reuse in a succeeding cycle of operation. A further example is the transfer of heat from a hot fluid to a cold fluid by means of a solid heat carrier which is heated by direct contact with the hot fluid and then brought into contact with the cold fluid. Unit operations of this type are commonly implemented either by using multiple swinging fixed beds of solid contact material or by employing a moving bed which is circulated through two or more zones such as the familiar reactor-regenerator configuration of fluid catalytic cracking, naphtha reforming and methane cracking processes. The use of swinging vessels suffers the disadvantages of complex piping and valving, contamination or loss of product streams by valve leakage, and high equipment cost. Moving beds, whether gravitating or fluidized, have the disadvantages of loss of solids by attrition, erosion of equipment, and need for complicated control systems to maintain process continuity.

One object of this invention is to provide a novel fluid-solid contacting apparatus useful in carrying out operations of the above described nature, employing a plurality of confined masses of solid contact material, whereby counterflow contact of the solids with several fluid streams is accomplished while avoiding solids attrition.

Another object of the invention is to provide a means for separating a mixture of components using a number of discrete sorption zones arranged in parallel counterflow sorption-desorption flow paths with periodic interchange of corresponding zones from one flow path to the other.

These and other objects of the invention will be apparent according to the following description and with reference to the accompanying drawings of which:

FIGURE 1 is an isometric view of one form of apparatus which may be used in carrying out the invention.

FIGURE 2 is an enlarged sectional elevation view of a typical contact mass as employed in the FIGURE 1 apparatus.

Figure 3:
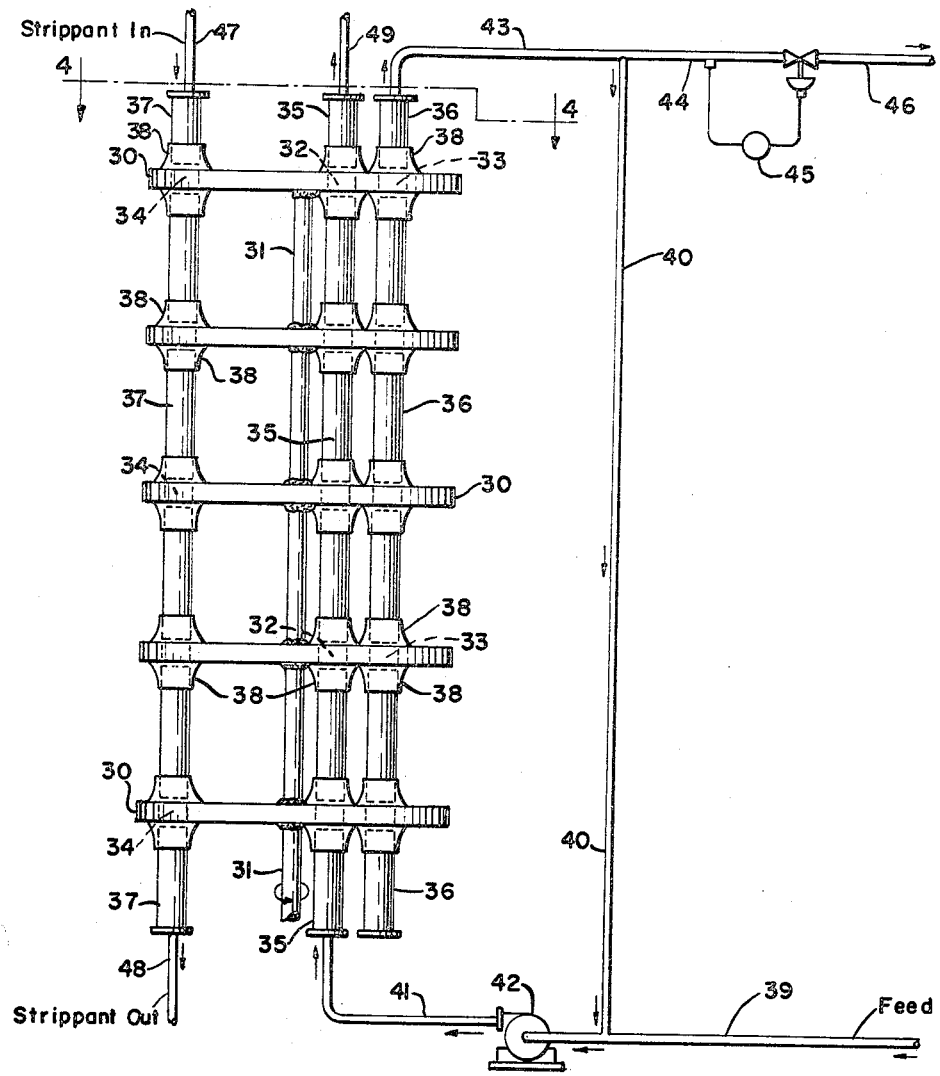
FIGURE 3 is an elevation view of another form of apparatus having special utility in the separation of gaseous mixtures.

In FIGURE 1 the apparatus comprises a plurality of discular rotor members 10 which are spaced along and rigidly secured to a rotary shaft 11. Each rotor member 10 is provided with a first passageway 12 and a second passageway 13, diametrically spaced 180° apart. These passageways extend completely through the respective rotor members in a direction parallel to the axis of rotation. In a preferred embodiment, passageways 12 of all rotor members are in axial alignment, as are passageways 13. Passageways 12 and 13 contain a solid contact material as more fully described below. A first group of stationary conduits 14 is arranged to register with and serially connect all passageways 12 and a second group of stationary conduits 15 is arranged to register with and serially connect all passageway 13, when the rotor members 10 occupy the adjusted angular position shown. When shaft 11 and rotor members 10 are turned through 180° to their other adjusted angular position, conduits 14 then serially connect passageways 13 and conduits 15 then serially connect passageways 12. Conduits 14 and 15 carry different fluid streams in opposite directions. Thus, a feed stream, which may be a reactant when the solid contact material is a catalyst or a mixture of components to be separated when the solid contact material is a selective sorbent, is introduced to the lowermost conduit 15 and product is withdraw from the uppermost conduit 15. A regenerant stream, which may be air, steam-air, oxygen, etc. when the solid contact material is a catalyst or a desorbent when the solid contact material is a selective sorbent, is introduced to the uppermost conduit 14 and withdrawn from the lowermost conduit 14. The clearances between conduits 14, 15 and rotor members 10 are sealed by flexible shields 16 to prevent fluid leakage therefrom while permitting relatively unimpeded rotation of members 10. Shaft 11 is supported and carried by a bearing 17 mounted in beam 18 which also supports conduits 14 and 15. Beam 18 in turn is embedded in concrete columns 19. Several such beams may be provided at vertical intervals between adjacent rotor members. Shaft 11 is driven through a coupling 20 by a suitable rotary driver 21 designed to periodically advance shaft 11 through 180° increments from one adjusted position thereof to the other. Driver 21 may be an electric motor, a ratchet-and-pawl stepping device actuated by pneumatic or hydraulic cylinders, or a pin and disc driver of the type described in the U.S. Patent 2,948,166. The rest time, or time spent by the rotors in each of their adjusted positions, may vary from about 10 seconds to about 8 hours depending upon the application.

FIGURE 2 illustrates suitable solids loading and conduit sealing arrangements for passageways 12, the same construction also being used for passageways 13. A fluid-pervious solid contact mass 22 is retained in passageway 12 by upper and lower screens 23. The physical form of the contact mass may be a bed of spheres, pellets or granules, a mat of interwoven fibers, metal ribboning, or a monolithic mass of porous material, such supports being impregnated or coated with catalytic or sorptive material. When the apparatus is employed to carry out catalyzed hydrocarbon conversion reactions, for example, the contact mass may be a hydroreforming catalyst such as platinum-alumina, a hydro-desulfurization catalyst such as cobalt-molybdenum-alumina, a cracking catalyst such as silica-alumina, or a polymerization catalyst such as nickel-kieselguhr, to mention but a few well-known compositions. When the apparatus is employed to separate a mixture of components by selective sorption, the contact mass may be molecular sieves, silica gel, activated carbon, activated alumina or an inactive porous support coated with a liquid absorbent. Upper and lower conduits 14 terminate a short distance from the surface of rotor 10 to facilitate easy rotation thereof, and the resulting clearance gaps are sealed, for example, by resilient bell-shaped boots or shields 16. These serve to prevent process fluid under superatmospheric pressure from escaping, or to prevent air from entering conduits 14, 15 if the process fluid is under subatmospheric pressure. Shields 16 are secured at one end to conduits 14 by bolts 24, while the free ends thereof are resiliently urged into essentially fluid-tight but sliding contact with the surface of rotor 10. Shields 16 may be fabricated of rubber, steel-reinforced rubber, metal matting, plastic and the like, suitably chosen to resist thermal and chemical attack by the process fluid flowing through the conduit in question.

The apparatus of FIGURE 1 may be employed, for example, to recover sulfur dioxide from gaseous sulfur burner effluent consisting essentially of sulfur dioxide and nitrogen. The solid contact material may be sawdust soaked with formamide which is preferentially selective for sulfur dioxide. Cooled sulfur burner effluent is fed to the lower conduit 15 and passes upwardly through the several absorption zones of pasageways 13 wherein sulfur dioxide is absorbed. Sulfur dioxide-depleted effluent or raffinate is discharged from upper conduit 15. After a predetermined time interval the rotor members 10 are quickly rotated 180° in unison whereby the sulfur dioxide-rich absorption zones are transferred into series flow relationship with conduits 14 and the absorption zones of passageway 12 are transferred into series flow relationship with conduits 15. A suitable strippant such as gaseous methane is passed into upper conduit 14 and flows downwardly through the several sulfur dioxide-rich absorption zones of passageways 13 whereby sulfur dioxide is stripped from the absorbent. A desorbate stream comprising methane and sulfur dioxide is withdrawn from lower conduit 14. At the same time sulfur dioxide is being absorbed in the absorption zones of passageways 12. After a predetermined time interval, preferably corresponding to optimum stripping of zones 13 and optimum absorption by zones 12, the rotor members are rotated another 180° back to their original position. The process is cyclically continued in this manner whereby countercurrent extraction of sulfur dioxide by the methane stream is obtained.

Another type of selective sorbent which may be used in this invention is a material characterized as a dehydrated metal aluminosilicate hydrate wherein the metal constituent is an alkali or an alkaline earth metal, also known as molecular sieves. These sorbents are particles having pore diameters in the range of 3 to 7 A. and are capable of selectively absorbing a variety of components depending upon the specific pore diameter range and size distribution. Molecular sieves may be used to separate normal hydrocarbons from a mixture thereof with non-normal hydrocarbons, the normals being selectively adsorbed; to remove water vapor as the selectively adsorbed material from a gaseous mixture thereof with one or more of the following less adsorbed materials: methane, ethane, propane, isobutane, hexane, oxygen, hydrogen, nitrogen, air and natural gas; to remove hydrogen sulfide or mercaptans as the selectively adsorbed materials from a gaseous mixture thereof with one or more of the following less adsorbed materials: methane, ethane, propane, n-butane, isobutane, n-pentane, isopentane, n-hexane, n-heptane, n-octane, hydrogen, carbon dioxide and natural gas; to remove carbon dioxide as the selectively adsorbed material from a gaseous mixture thereof with one or more of the following less adsorbed materials: methane, ethane, ethylene, propane, butane, pentane, nitrogen, hydrogen, and carbon monoxide; to remove normal unsaturated $C_1$–$C_3$ hydrocarbons as the selectively adsorbed materials from a gaseous mixture thereof with one or more of the following less adsorbed materials: methane, ethane, oxygen, hydrogen, and nitrogen; to remove isobutane as the selectively adsorbed material from a gaseous mixture thereof with one or more $C_1$–$C_3$ paraffins; to separate mononuclear aromatic hydrocarbons from a mixture of mononuclear and polynuclear aromatic hydrocarbons, the mononuclear aromatics being selectively adsorbed.

Other types of selective sorbents which may be used in the invention include dehydrated silica gel, activated charcoal and activated alumina. These adsorbents may be used to separate mercaptans or amines from a mixture of mercaptans or amines with a paraffinic hydrocarbon fraction; to separate olefins from a mixture of olefins and paraffins; to separate aromatic hydrocarbons from a mixture of aromatic hydrocarbons and non-aromatic hydrocarbons; and to remove water from a mixture of water vapor with the air, nitrogen or other inert gas, or paraffinic hydrocarbons.

Figure 4:
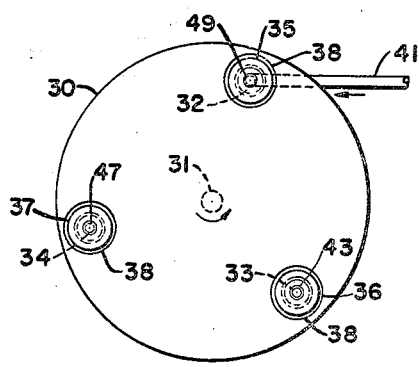
FIGURE 4 is a plan view of the FIGURE 3 apparatus taken along line 4—4 of FIGURE 3.

One difficulty sometimes encountered in the separation of a gaseous mixture by selective sorption is that minor amounts of relatively less sorbed material will nevertheless be trapped in the open pores or interstitial spaces of the sorbent so that, upon desorption, the sorbate is unduly contaminated with less sorbed material. The modified apparatus of FIGURES 3, 4 is designed to improve separation efficiency through the provision of an intermediate depressurization zone between the sorption and desorption zones. In this zone the undesirable component is disengaged from the pores or interstitial spaces of the sorbent by the expansion of the selectively sorbed component and displacement of the undesirable less sorbed component.

With reference to FIGURE 3, a number of axially spaced rotor members 30 are mounted on a rotary shaft 31. Each rotor member has three passageways 32, 33 and 34 spaced 120° apart, equidistant from and parallel to the axis of rotation. These passageways contain beds of selective sorbent. With rotors 30 in the position shown, passageways 32 are serially connected by stationary conduits 35, passageways 33 by stationary conduits 36, and passageways 34 by stationary conduits 37. Clearance gaps between conduits 35, 36 and 37 and rotors 30 are sealed by resilient shields 38. Fresh feed gas enters the unit through line 39, is then mixed with recycle gas from line 40, compressed by compressor 42 and charged through line 41 to lower conduit 35. In passing upwardly through the series of sorption zones defined by passageways 32, the feed gas becomes depleted in selectively sorbed material and is taken off as a raffinate stream through line 49. Conduits 36 form a closed depressurization system in communication with passageways 33 which is maintained under substantially lower pressure than the sorption zones. The sorbent beds of passageways 33 served as the sorption zones in the immediately preceding phase of operation and contain selectively sorbed gas as well as minor amounts of undesirable less sorbed gas. The less sorbed gas is released therein and taken off through line 43; a portion is segregated and returned to the fresh feed inlet through line 40 and the balance is vented through line 44, back pressure control valve 45 and line 46. The sorbent beds of passageways 34 functioned as the depressurization zones in the immediately preceding phase of operation and are therefore relatively free of undesirable less sorbed gas. A desorbent or strippant stream is charged through line 47 and flows downwardly through the series of desorption zones defined by passageways 34, desorbing the selectively sorbed gas which is withdrawn as a sorbate stream, comprising selectively sorbed gas and desorbent, from lower conduit 37 and line 48. Shaft 31 is periodically advanced in 120° increments such that each of the three series of zones repetitively serves as the sorption, depressurization and desorption zones in that sequence, e.g.:

| | Shaft Position | | |
|---|---|---|---|
| Conduits | I Passageways | II Passageways | III Passageways |
| 35 | 32 | 34 | 33 |
| 36 | 33 | 32 | 34 |
| 37 | 34 | 33 | 32 |

Various modifications of the above described apparatus will be apparent to those skilled in the art. For example, the axis of rotation of the apparatus may be horizontal or inclined to the horizontal, as well as vertical. The rotor members may be driven by individual synchronized ring gears instead of a common shaft. The rotor members may have a shape other than discular, as for example, they may be square polygonal, etc. The rotor passageways may be non-parallel to the axis of rotation and may extend from the top to the side of the rotor, from the side to the bottom of the rotor, or from side to side of the rotor. Hydrocarbon conversion catalyst may be employed in FIGURE 3 apparatus as well as a selective sorbent, where it is desired to carry out catalyzed reactions thereby.

I claim as my invention:
1. Fluid-solid contacting apparatus comprising:
   (1) a series of rotor members spaced along a common axis of revolution, said rotor members having first, second and third adjusted angular positions;
   (2) rotary drive means for turning said rotor members in unison sequentially from one adjusted position to the next;
   (3) first, second and third passageways extending through each rotor member;
   (4) a fluid-pervious contact mass retained within each of said passageways;
   (5) a first conduit means disposed externally of the rotor members and arranged to register with and serially connect (a) said first passageways of each of said rotor members when the latter are in said first position and (b) said third passageways of each of said rotor members when the latter are in said second position and (c) said second passageways of each of said rotor members when the latter are in said third position;
   (6) a second conduit means disposed externally of the rotor members and arranged to register with and serially connect (a) said second passageways of each of said rotor members when the latter are in said first position and (b) said first passageways of each of said rotor members when the latter are in said second position and (c) said third passageways of each of said rotor members when the latter are in said third position;
   (7) a third conduit means disposed externally of the rotor members and arranged to register with and serially connect (a) said third passageways of each of said rotor members when the latter are in said first position and (b) said second passageways of each of said rotor members when the latter are in said second position and (c) said first passageways of each of said rotor members when the latter are in said third position; and
   (8) means connecting with said third conduit means to effect depressurization of said fluid-pervious contact masses as and when said third, second and first pasageways are sequentially moved into registry with said third conduit means.

2. The apparatus of claim 1 wherein said rotary drive means includes a rotary shaft on which said rotor members are mounted.

3. The apparatus of claim 1 wherein said contact mass is a hydrocarbon conversion catalyst.

4. The apparatus of claim 1 wherein said contact mass comprises a selective sorbent.

5. The apparatus of claim 1 wherein the three passageways of each rotor member are equidistant from and parallel to said axis of rotation and are spaced 120° apart.

6. The apparatus of claim 5 wherein the first, second and third passageways of all rotor members are respectively coaxially aligned.

7. The apparatus of claim 6 wherein said rotor members are discular in shape.

References Cited

UNITED STATES PATENTS

| 2,516,943 | 8/1950 | Barber | 23—288 |
| 2,558,861 | 7/1951 | Liggett | 23—288 |
| 2,617,986 | 11/1952 | Miller | 23—288 X |
| 2,700,537 | 1/1955 | Pennington | 261—83 |
| 3,240,068 | 3/1966 | Horeth et al. | |

JOSEPH SCOVRONEK, Primary Examiner

U.S. Cl. X.R.

23—284; 210—203, 324; 261—83